(12) United States Patent
Johannes

(10) Patent No.: US 12,111,333 B2
(45) Date of Patent: Oct. 8, 2024

(54) SENSOR ARRANGEMENT, APPARATUS FOR POSITION DETERMINATION, RAIL VEHICLE AND METHOD FOR POSITION DETERMINATION FOR A RAIL VEHICLE

(71) Applicant: Siemens Mobility GmbH, Munich (DE)

(72) Inventor: Lars Johannes, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 127 days.

(21) Appl. No.: 17/724,687

(22) Filed: Apr. 20, 2022

(65) Prior Publication Data

US 2022/0334142 A1  Oct. 20, 2022

(30) Foreign Application Priority Data

Apr. 20, 2021  (DE) .................. 10 2021 203 898

(51) Int. Cl.
*G01P 3/36* (2006.01)
*B60W 40/105* (2012.01)
(Continued)

(52) U.S. Cl.
CPC ............. *G01P 3/36* (2013.01); *B60W 40/105* (2013.01); *B61L 15/0063* (2013.01);
(Continued)

(58) Field of Classification Search
CPC ............. B16L 15/0063; B16L 15/0081; B16L 25/021; B16L 25/025; B16L 25/026;
(Continued)

(56) References Cited

U.S. PATENT DOCUMENTS 4,896,090 A * 1/1990 Balch .................... B60T 8/1705
318/52
10,459,001 B2  10/2019 Foerster et al.
(Continued)

FOREIGN PATENT DOCUMENTS

AU  2005234619 A1  6/2006
DE  10343070 A1  4/2005
(Continued)

OTHER PUBLICATIONS

Glaus R., "Kinematic Track Surveying by Means of a Multi-Sensor Platform," 2006, Swiss Federal Institute of Technology Zurich, Diss. ETH No. 16547, pp. I-X & 1-185 (Year: 2006).*
(Continued)

*Primary Examiner* — John M Zaleskas
(74) *Attorney, Agent, or Firm* — Laurence A. Greenberg; Werner H. Stemer; Ralph E. Locher

(57) ABSTRACT

A sensor arrangement for position determination of a rail vehicle includes at least two sensors that can be attached to the rail vehicle. Each of the sensors is configured to ascertain a position speed and to be disposed on the rail vehicle at different positions transverse to the direction of travel. At least one processing apparatus which is connected to the sensors is configured to process the position speeds ascertained by the sensors. An apparatus for position determination of a rail vehicle, a rail vehicle, and a method for position determination for a rail vehicle are also provided.

8 Claims, 1 Drawing Sheet

(51) Int. Cl.
  *B61L 15/00* (2006.01)
  *B61L 25/02* (2006.01)
  *G01S 17/58* (2006.01)
  *G01S 19/21* (2010.01)
(52) U.S. Cl.
  CPC ......... *B61L 15/0081* (2013.01); *B61L 25/021* (2013.01); *B61L 25/025* (2013.01); *B61L 25/026* (2013.01); *G01S 17/58* (2013.01); *G01S 19/215* (2013.01); *B60Y 2400/303* (2013.01); *B61L 2205/04* (2013.01)
(58) Field of Classification Search
  CPC .... B16L 2205/04; G01S 17/58; G01S 19/215; G01P 3/36; B60Y 2400/303; B60W 40/105
  See application file for complete search history.

(56) References Cited

U.S. PATENT DOCUMENTS

| | | | | |
|---|---|---|---|---|
| 2003/0216865 | A1* | 11/2003 | Riewe | G01S 19/47 701/470 |
| 2008/0306687 | A1* | 12/2008 | Ryu | G01C 21/10 701/469 |
| 2009/0205401 | A1* | 8/2009 | Munko | G01P 21/02 73/1.37 |
| 2010/0324776 | A1* | 12/2010 | Maire | B61L 25/021 701/31.4 |
| 2015/0008294 | A1* | 1/2015 | Desbordes | G06T 7/20 246/122 R |
| 2015/0088345 | A1* | 3/2015 | Nandedkar | B61L 25/026 701/20 |
| 2016/0109476 | A1* | 4/2016 | Foerster | B60T 13/665 702/142 |
| 2017/0106884 | A1* | 4/2017 | Oswald | B61L 15/0072 |
| 2019/0232978 | A1* | 8/2019 | Im | B61C 17/00 |
| 2022/0185348 | A1* | 6/2022 | Johannes | B61L 25/021 |
| 2022/0266882 | A1* | 8/2022 | Staab | B61L 23/041 |
| 2023/0084387 | A1* | 3/2023 | Johannes | G01S 5/0294 455/456.1 |
| 2023/0182790 | A1* | 6/2023 | Michel | G01P 7/00 701/19 |

FOREIGN PATENT DOCUMENTS

| | | | | |
|---|---|---|---|---|
| DE | 602005003351 | T2 | 6/2008 | |
| DE | 102013001973 | B3 | 1/2014 | |
| DE | 102013210361 | A1 | 12/2014 | |
| EP | 1705095 | A1 * | 9/2006 | ........... B61L 25/021 |
| EP | 3418137 | A1 * | 12/2018 | ............ B60T 8/172 |
| EP | 3789264 | A1 * | 3/2021 | ......... B61L 15/0081 |
| WO | WO-2008079456 | A1 * | 7/2008 | ........... B61L 25/021 |

OTHER PUBLICATIONS

Mumin T.E., Kerim K., Mutlu S., Bilin A.G., Levent G., and Baris E., "Vehicle Yaw Rate Estimation Using a Virtual Sensor," 2013, Hindawi Publishing Corporation, International Journal of Vehicular Technology, vol. 2013, Article ID 582691, pp. 1-13 (Year: 2013).*
Ralph Glaus: "Kinematic track surveying by means of a multi-sensor platform", Dr. Alain Geiger, Jan. 1, 2006 (Jan. 1, 2006), XP055199621, DOI: 10.3929/ethz-a-005168061, Retrieved from the Internet: URL:http://dx.doi.org/10.3929/ethz-a-005168061.

\* cited by examiner

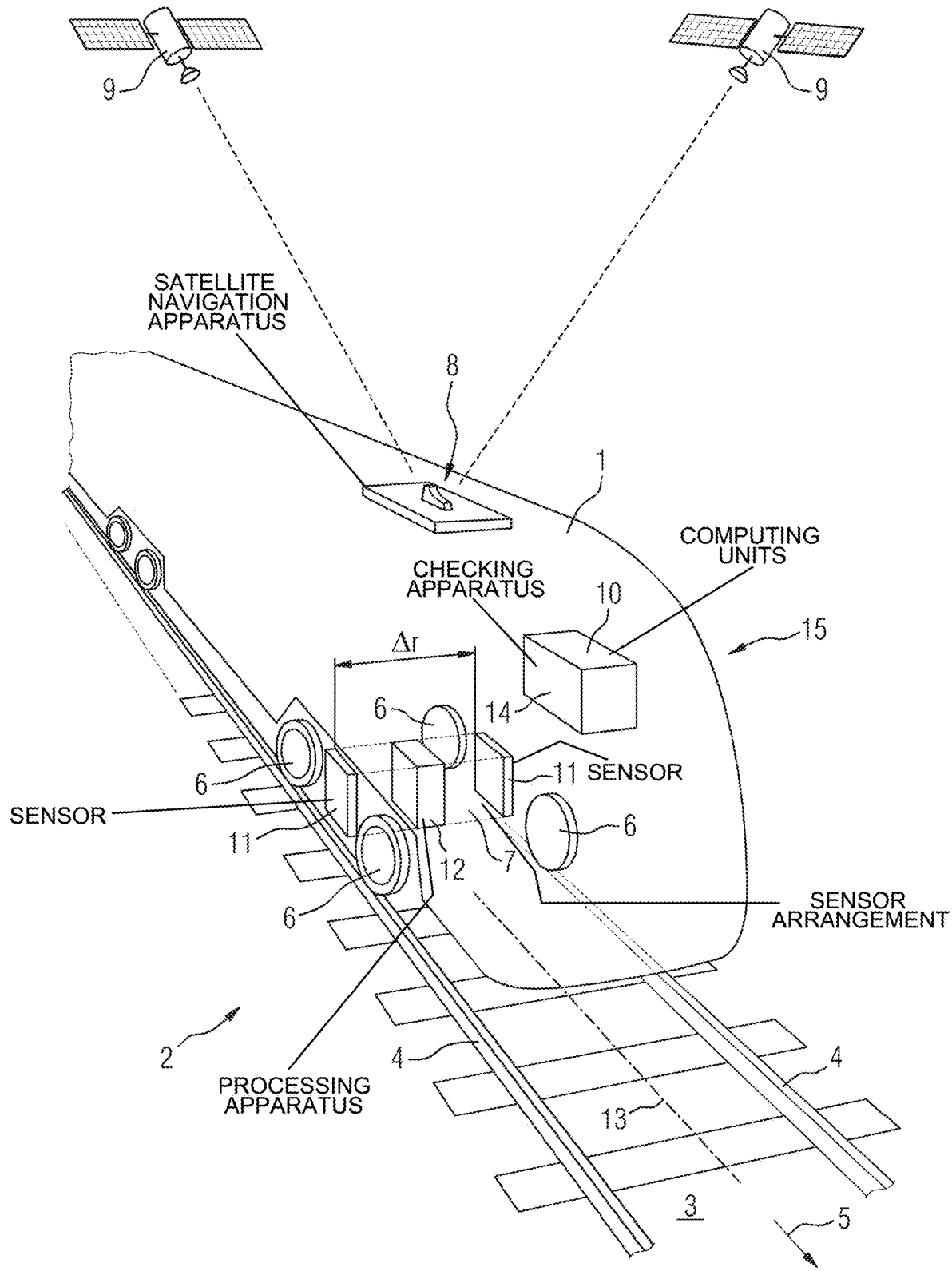

SENSOR ARRANGEMENT, APPARATUS FOR POSITION DETERMINATION, RAIL VEHICLE AND METHOD FOR POSITION DETERMINATION FOR A RAIL VEHICLE

CROSS-REFERENCE TO RELATED APPLICATION

This application claims the priority, under 35 U.S.C. § 119, of German Patent Application DE 10 2021 203 898.0, filed Apr. 20, 2021; the prior application is herewith incorporated by reference in its entirety.

FIELD AND BACKGROUND OF THE INVENTION

The position determination of a rail vehicle is a very important task in rail transport today, because inter alia the safety of a railway system depends thereon. If errors had occurred during position determination of the rail vehicle, that could result in hazards or accidents with grave consequences for people and systems involved. The position determination is also often referred to as odometry.

SUMMARY OF THE INVENTION

It is accordingly an object of the invention to provide a sensor arrangement, an apparatus for position determination, a rail vehicle and a method for position determination for a rail vehicle, which overcome the hereinafore-mentioned disadvantages of the heretofore-known devices and methods of this general type.

With the foregoing and other objects in view there is provided, in accordance with the invention, a sensor arrangement for position determination for a rail vehicle, comprising at least two sensors which can be attached to the rail vehicle, the sensors configured to ascertain a position speed and to be disposed on the rail vehicle at different positions transverse to the direction of travel, and at least one processing apparatus configured to process the position speeds that are ascertained by the sensors.

With the objects of the invention in view, there is additionally provided a method for position determination for a rail vehicle, wherein at least two position speeds are ascertained at respectively different positions of the rail vehicle transverse to the direction of travel, and the at least two position speeds are processed and used for the position determination of the rail vehicle.

The present invention has the advantage that the position determination of the rail vehicle is improved by taking the at least two position speeds into consideration. The position speeds can firstly be used to check a position of the rail vehicle that was previously determined, e.g. using GNSS data. The position speeds can also be used as additional input variables in order to make a location-fixing result more accurate or deliberate, or the position speeds can be used e.g. in the case of unfavorable conditions such as very low speed or in a tunnel. For example, the problem exists in the case of satellite navigation systems that the GNSS data obtained therefrom can be distorted by so-called spoofing. That GNSS data which has been distorted by spoofing can result in incorrect position calculations of the rail vehicle. That can be prevented by the solution according to the present invention. Furthermore, the inventive solution can also be used to improve a location-fixing system without satellite navigation.

A position speed in this case is considered to be the speed that applies to a specific position on the rail vehicle, for which position the speed is measured or determined. When travelling around curves, it is well known that an outer position on the rail vehicle has a different speed than an inner position. Therefore different speeds prevail depending on position, and are consequently referred to as position speeds herein. These relate to the specific position. If e.g. the speed is ascertained using an incremental distance indicator disposed at a wheel, the speed applies to the position of the wheel transverse to the direction of travel.

For the purpose of ascertaining the position speeds, the inventive sensor arrangement uses the at least two sensors that can be attached to the rail vehicle. These are disposed on the rail vehicle at different positions transverse to the direction of travel and ascertain a position speed there. On the basis of these at least two position speeds, e.g. a speed at the center of the rail vehicle can be ascertained as a calculation variable and may also be referred to as a central speed. This can be an angular velocity or an average speed, for example.

Using the method according to the invention, the position speeds are ascertained and used for the position determination of the rail vehicle.

The inventive solution can be developed further by advantageous embodiments as described in the following.

In an advantageous development of the inventive sensor arrangement, at least one of the sensors can be configured as an incremental distance indicator connected to a wheel, wherein the wheel is not connected through a rigid axle to an opposite wheel transverse to the direction of travel. This has the advantage that incremental distance indicators are often already used in rail vehicles and therefore represent an economical solution in particular for an upgrade. It is important in this context that the wheel used for the incremental distance indicator is independent and is not connected to an opposite wheel through a rigid axle. Using a rigid axle, the values of the incremental indicator would be distorted when travelling around a curve because the outer wheel travels a greater distance than the inner wheel in a curve, and that would be prevented by a rigid axle.

In order to ensure that measurements can be taken independently of the wheels of the rail vehicle, for example, at least one of the sensors can be configured as an optical or inductive sensor. An optical sensor can be e.g. a camera or a sensor which works according to the principle of spatial filter velocimetry. Optical sensors are usually directed at the rail head and inductive sensors are often directed at the rail base fixings since they are suitable for inductive detection. Both optical and also inductive sensors capture a movement of the rail vehicle relative to the track. Alternatively, one or both of the sensors can clearly be configured as dual radars.

The inventive sensors are configured to ascertain a position speed. The position speed in this case is understood to be a relative movement at the specific position of the rail vehicle in relation to the track or the ground. In this way, the sensors capture a distance covered in a measured time and determine the speed therefrom in the usual manner.

Furthermore, the sensors can be disposed substantially directly opposite each other transverse to the direction of travel. This has the advantage that the position speeds ascertained by the sensors can easily be used for the position checking.

In order to ensure good visibility of the track below the vehicle, particularly in the case of optical or inductive sensors, the sensors can be disposed between two wheels of the rail vehicle as viewed in the direction of travel.

In a further advantageous embodiment, the sensors can be so disposed transverse to the direction of travel as to have a substantially identical separation from the midpoint of the rail vehicle. It is assumed in this case that the midpoint of the rail vehicle is identical to the midpoint between the wheels. The midpoint is therefore located at the midpoint between the rails. For the purpose of determining the average speed, it is therefore easy to take the average of the two position speeds.

Furthermore, the sensor arrangement can be configured to ascertain an angular velocity of the rail vehicle. The use of the angular velocity is advantageous because this can be compared directly with an angular velocity that is calculated from GNSS data. Alternatively, a trajectory can also be calculated from the angular velocity and then compared with a trajectory that is calculated from GNSS data. Furthermore, the sensor arrangement can be configured to ascertain the angular velocity of the rail vehicle using the formula $$\omega = \frac{v_1 - v_2}{\Delta r},$$

where $v_1$ and $v_2$ are position speeds ascertained by using the sensors and $\Delta r$ is a separation of the sensors from each other.

Alternatively, the sensor arrangement can be configured to ascertain an average speed of the rail vehicle. The speed of the rail vehicle at its vehicle midpoint is considered to be an average speed. On the rail vehicle, the inner wheel of the curve rotates more slowly and the outer wheel more quickly than would be the case at the vehicle midpoint. The average speed is the speed at the vehicle midpoint of the rail vehicle. If a sensor was used on one vehicle side, slip detection algorithms could possibly take effect in curves and that is not desirable. The vehicle could then erroneously be operated at a lower speed, for example, and would fail to adhere to its schedule.

With the objects of the invention in view, there is also provided an apparatus for position determination for a rail vehicle having at least one satellite navigation apparatus which is configured to provide GNSS data.

According to the invention, the apparatus is so configured as to include at least one sensor arrangement according to one of the embodiment variants cited above and has at least one checking apparatus which is configured to check the GNSS data provided by the satellite navigation apparatus, or a position ascertained therefrom, by using the position speeds ascertained by the sensor arrangement. This has the advantage that e.g. GNSS data which has been distorted due to so-called spoofing can immediately be recognized and an erroneous position determination of the rail vehicle can be avoided thereby.

In an advantageous development of this apparatus, the checking apparatus can be configured to compare an angular velocity ascertained by using the GNSS data with an angular velocity ascertained by the sensor arrangement and to trigger an action if a difference between the two angular velocities exceeds a predetermined limit value.

With the objects of the invention in view, there is furthermore provided a rail vehicle having at least one sensor arrangement according to one of the embodiment variants cited above and/or at least one inventive apparatus for position determination according to one of the embodiment variants cited above.

In an advantageous embodiment of the inventive method, an angular velocity and/or an average speed of the rail vehicle can be ascertained. This has the same advantages as those described above in relation to the corresponding embodiment variant of the inventive sensor arrangement.

In order to check the position using a satellite navigation system, the GNSS data can be provided by at least one satellite navigation apparatus of the rail vehicle and the GNNS data or a position ascertained therefrom can be checked by using the position speeds ascertained by the sensor arrangement.

Other features which are considered as characteristic for the invention are set forth in the appended claims.

Although the invention is illustrated and described herein as embodied in a sensor arrangement, an apparatus for position determination, a rail vehicle and a method for position determination for a rail vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURE

The single FIGURE of the drawing is a diagrammatic, perspective view of an exemplary embodiment variant of a rail vehicle according to the invention.

DETAILED DESCRIPTION OF THE INVENTION

Referring now in detail to the single FIGURE of the drawing, there is seen an exemplary embodiment variant of a rail vehicle 1 according to the invention. The rail vehicle 1 is part of a railway system 2. In addition to the rail vehicle 1, the railway system 2 also includes a track 3 with rails 4 on which the rail vehicle 1 moves in a direction of travel 5. The rail vehicle 1 can be e.g. a long-distance train, freight train, regional train, underground train or tram and is embodied in a customary manner. The rail vehicle 1 therefore includes a multiplicity of wheels 6, of which only some are illustrated by way of example and which are in contact with the rails 4 in a customary manner. The rail vehicle 1 further includes at least one sensor arrangement 7 and a satellite navigation apparatus 8.

The satellite navigator 8 is embodied in a customary manner and determines GNSS data from signals of satellites 9. The GNSS data allows a position of the rail vehicle 1 to be ascertained in a customary manner. The abbreviation GNSS stands for Global Navigation Satellite System. Known examples of satellite navigation systems based on GNSS include the European system Galileo, the American system GPS or the Russian system GLONASS. It is possible to ascertain the position of the rail vehicle 1 on the basis of the GNSS data ascertained by the satellite navigation apparatus 8. This can be performed either directly by the satellite navigation apparatus 8 or by a computing unit 10 which is situated in the rail vehicle 1. The computing unit 10 can be part of an on-board computer, for example. However, the position of the rail vehicle 1 as ascertained by using the GNSS data can be erroneous. That can occur as a result of so-called spoofing, for example, when incorrect position data is ascertained as a result of interference signals.

The rail vehicle 1 of the present invention has the sensor arrangement 7 in order to counter that problem. The sensor arrangement 7 includes two sensors 11 and a processing apparatus 12.

The sensors 11 are each configured to ascertain a position speed and are disposed at different positions on the rail vehicle 1. The position speed in this case is understood to mean the speed relative to the track 3 that is ascertained by the respective sensors 11 for a specific position on the rail vehicle 1.

The sensors 11 can be configured in each case as incremental distance indicators connected to a wheel 6, optical or inductive sensors, for example. In the case of the embodiment as an incremental distance indicator, the sensor is connected to a wheel 6 of the rail vehicle 1 so that the movement of the wheel 6 is captured by the incremental distance indicator and the speed at the position of the wheel 6 can be ascertained thereby. The incremental distance indicator must be disposed at a wheel 6 which is not connected through a rigid axle to the corresponding opposite wheel 6 transverse to the direction of travel 5. Otherwise the measured position speed would be distorted in a curve. In the case of an embodiment as an optical sensor, the sensor captures e.g. the movement of the rail vehicle 1 at the corresponding position relative to the rail head of the corresponding rail 4. In the case of the embodiment as an inductive sensor, the sensor can capture e.g. the traversed rail base fixings and thereby the distance covered and the position speed.

The sensors 11 are ideally disposed directly opposite each other, transverse to the direction of travel 5, and have an identical separation from a midpoint 13 of the rail vehicle 1. In the case of the exemplary embodiment variant shown in the FIGURE, the sensors 11 are also disposed in each case between two wheels 6 of the rail vehicle 1 as viewed in the direction of travel 5. In this case, the sensors 11 are situated on substantially the same line as the wheels 6, in such a way that the sensors 11 are disposed above the respective rails 4 of the track 3 in each case.

The sensor arrangement 7 according to the present invention ascertains an angular velocity ω of the rail vehicle 1 from the position speeds $v_1$, $v_2$. The angular velocity ω can be ascertained by using the formula $$\omega = \frac{v_1 - v_2}{\Delta r},$$

where $v_1$ and $v_2$ are the position speeds ascertained by using the sensors and $\Delta r$ is the separation of the sensors from each other. The angular velocity ω can be ascertained either by the sensor arrangement 7 itself or by the computing unit 10. For example, the computing unit 10 can then use the angular velocity ω ascertained by the sensor arrangement 7 to check the GNSS data of the satellite navigation apparatus 8. An angular velocity ω of the rail vehicle 1 can also be ascertained from the GNSS data. The two ascertained angular velocities can then be compared with each other. A checking apparatus 14 is provided within the computing unit 10 for this purpose, and is configured to check the GNSS data provided by the satellite navigation apparatus 8 or a position ascertained therefrom. The checking apparatus 14 triggers an alarm if a difference between the angular velocity ascertained from GNSS data and the angular velocity ascertained from the position speeds exceeds a predetermined limit value.

The sensor arrangement 7, the satellite navigation apparatus 8 and the checking apparatus 14 together form an apparatus 15 according to the present invention for position determination of the rail vehicle 1.

The sensor arrangement 7 according to the present invention can also be used to ascertain an average speed. On a rail vehicle 1, when travelling around curves, the speed at the position of the inner wheels of the curve is lower, and at the position of the outer wheels 6 of the curve is higher, than the average speed at the midpoint 13. Therefore the average speed can advantageously be used because, even when travelling around curves, it is not distorted.

The invention claimed is:

1. An apparatus for position determination of a rail vehicle, the apparatus comprising:
    at least one satellite navigation apparatus configured to provide GNSS data;
    at least two sensors for ascertaining an angular velocity ω and a position speed of the rail vehicle, said at least two sensors configured to be attached to the rail vehicle at mutually different positions transverse to a direction of travel of the rail vehicle, at least one of said at least two sensors being:
    an optical sensor, or
    an inductive sensor, or
    configured as dual radar;
    at least one processing apparatus configured to process the position speeds ascertained by said at least two sensors and to ascertain the angular velocity ω of the rail vehicle by using a formula $$\omega = \frac{v_1 - v_2}{\Delta r},$$

where $v_1$ and $v_2$ are position speeds ascertained by using said at least two sensors and $\Delta r$ is a separation of said at least two sensors from each other; and
    at least one checking apparatus configured to check the GNSS data provided by said at least one satellite navigation apparatus or a position ascertained from the GNSS data provided by said at least one satellite navigation apparatus;
    said at least one checking apparatus configured to compare an angular velocity ascertained by using the GNSS data with the angular velocity ascertained by said at least two sensors and to trigger an action when a difference between the angular velocities exceeds a predetermined limit value.

2. The apparatus according to claim 1, wherein at least one of said at least two sensors is an incremental distance indicator to be connected to a wheel not connected through a rigid axle to an opposite wheel transverse to the direction of travel of the rail vehicle.

3. The apparatus according to claim 1, wherein at least one of said at least two sensors is an optical or inductive sensor.

4. The apparatus according to claim 1, wherein said at least two sensors are configured to be disposed opposite each other transverse to the direction of travel of the rail vehicle.

5. The apparatus according to claim 1, wherein said at least two sensors are configured to be disposed between two wheels of the rail vehicle as viewed in the direction of travel of the rail vehicle.

6. The apparatus according to claim 1, wherein said at least two sensors disposed transverse to the direction of travel of the rail vehicle are separated by an identical distance from a midpoint of the rail vehicle.

7. The apparatus according to claim 1, wherein said at least two sensors are configured to ascertain an average speed of the rail vehicle.

8. A rail vehicle, comprising at least one apparatus for position determination according to claim 1.

* * * * *